April 29, 1930.　　　N. M. MARSILIUS　　　1,756,831
MILLING MACHINE
Filed May 17, 1927　　　5 Sheets-Sheet 2

INVENTOR.
Newman M. Marsilius
BY
Chamberlain + Newman
ATTORNEYS.

April 29, 1930.   N. M. MARSILIUS   1,756,831
MILLING MACHINE
Filed May 17, 1927   5 Sheets-Sheet 4

INVENTOR.
Newman M. Marsilius
BY
Chamberlain & Newman
ATTORNEYS.

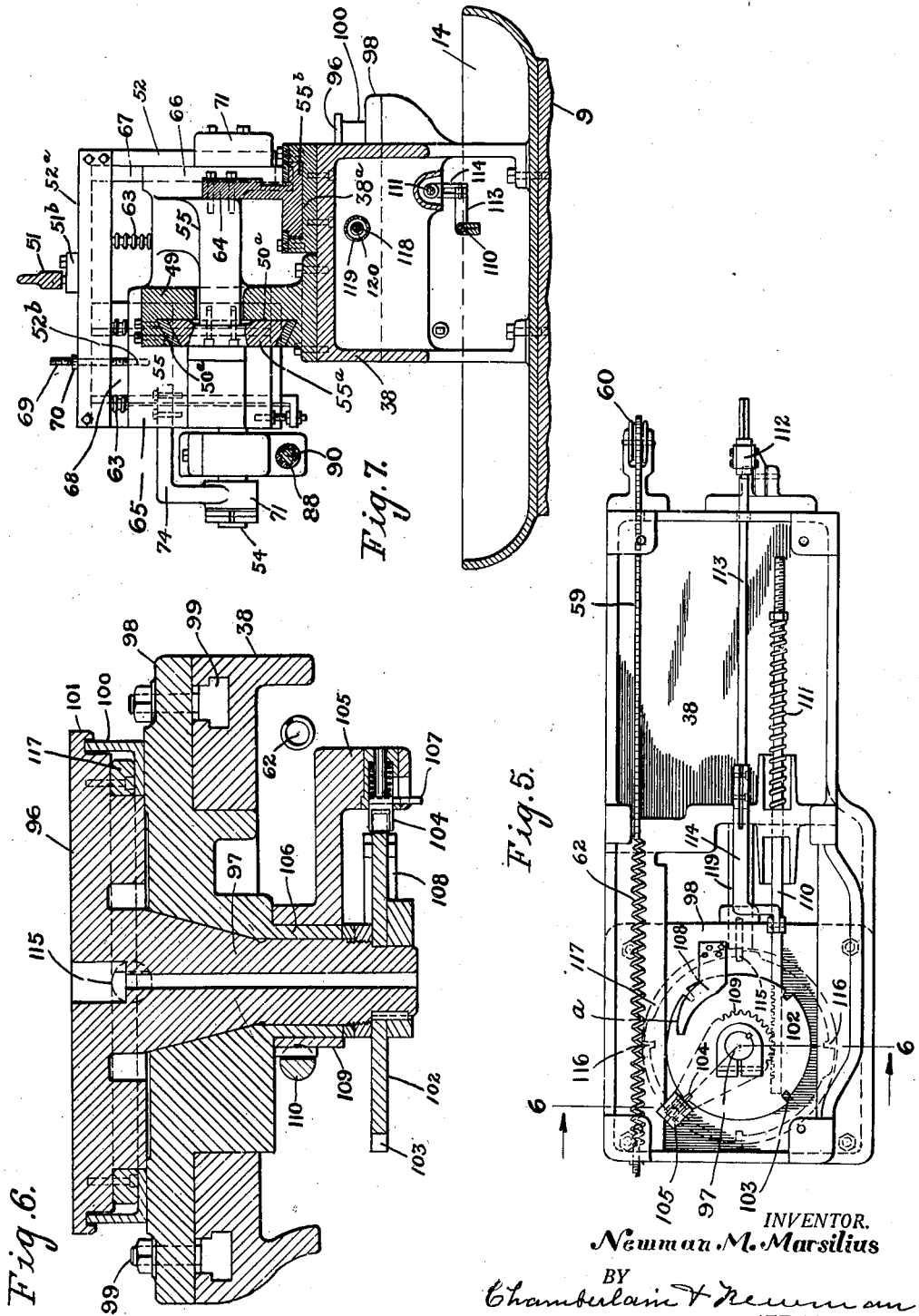

Patented Apr. 29, 1930

1,756,831

UNITED STATES PATENT OFFICE

NEWMAN M. MARSILIUS, OF BRIDGEPORT, CONNECTICUT, ASSIGNOR, BY MESNE ASSIGNMENTS, TO THE PRODUCTO MACHINE COMPANY, OF BRIDGEPORT, CONNECTICUT, A CORPORATION OF CONNECTICUT

MILLING MACHINE

Application filed May 17, 1927. Serial No. 192,002.

My invention relates to new and useful improvements in automatic milling machines, of the turret station type, designed for milling various shaped parts.

The object of the invention is to generally improve upon the type of machine known as the "Pro-Ducto-Matic" and machines of its general type, adapted for high production of short-cut milling jobs. The machine also comprises further improvements on that type of machine shown and described in my pending application Ser. No. 75,276, filed December 14th, 1925.

The machine is adapted for carrying different style turrets and fixtures and can thus be made to perform different kinds of milling operations, such as squaring, hexing, or octagon, straddle-milling, slabbing, grooving, keywaying, cross-milling, etc.

A further feature is to provide a turret type of milling machine wherein all short-cut milling operations can be done faster, more economically and at less investment than other known machines upon the market. The machine herein presented includes a large cabinet base of sufficient weight and floor space to withstand strains of heavy cuts. It preferably includes a self-contained motor drive with which is connected two lines of driving mechanism, including one for the feeding and the other for the cutting operations. The machine is fully automatic, easily operated and adapted for changes of feeds and speeds as may be desired.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a plan view of my improved type of automatic milling machine;

Fig. 5 is an inverted or bottom plan view of the machine bed removed from the base, and illustrating the turret indexing mechanism;

Fig. 6 shows an enlarged cross-sectional view through the turret spindle and indexing means, taken on line 6—6 of Fig. 5; and Fig. 7 is a vertical cross section through the upper portion of the machine and bed, taken on line 7—7 of Fig. 2, looking in the direction of arrow.

Figure 1:
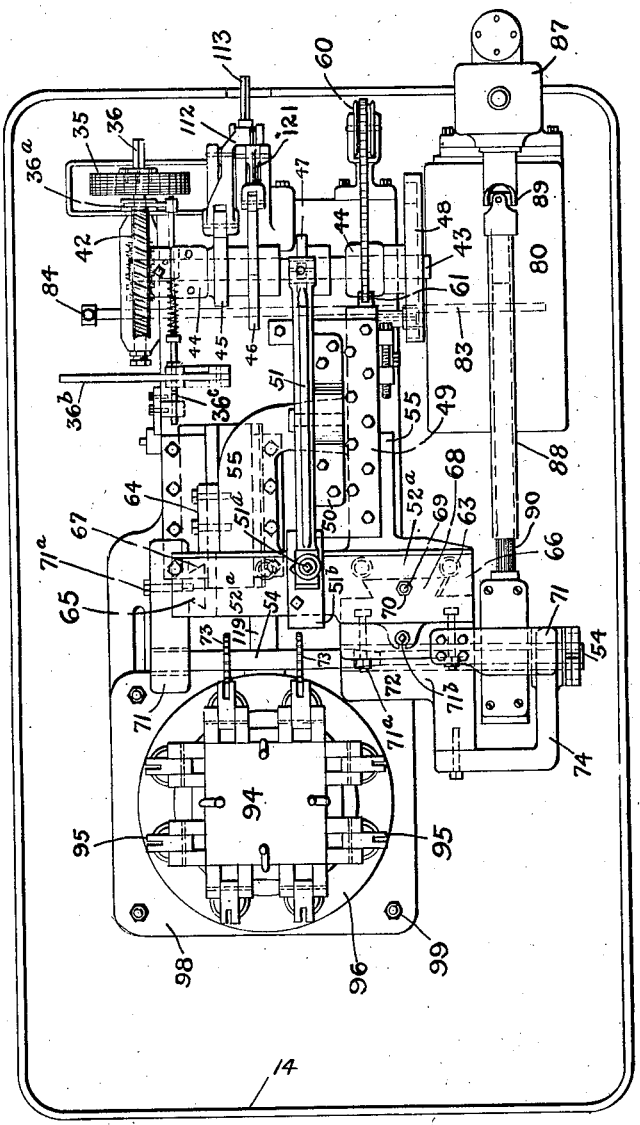

Referring in detail to the characters of reference marked upon the drawings, 9 indicates the base, hereinbefore referred to as a cabinet base, and which includes a large casting of suitable height and proportion to accommodate different sizes of machines, since we make them in different sizes and find it more economical to have a uniform size of base for each of the different size machines. This base includes a chamber 10 in its forward end and gear boxes 11 and 12 in the rear end portion, said boxes are provided with removable plates 13—13 whereby access to the gears may be had for the purpose of changing the feeds and speeds. The base includes a top covering having outwardly and upwardly flanged end and side portions forming a receptacle 14 adapted to catch oil and chips and provides room for tools and other parts. The base includes an open space 15 in which the motor 16 is positioned, said motor being in central longitudinal alignment with said base and coupled as at 17 to drive-shaft 18, upon which is mounted sprockets 19 and 20. One of said sprockets being connected to drive one set mechanism, namely: that for feeding the cutter forward and backward as well as the turret indexing mechanism and the other for the purpose of driving the cutters which perform the milling operations. The two sets of drives herein referred to are each provided with separate clutch mechanisms for starting and stopping the respective drives, as will again be referred to. The sprockets 19 and 20 are connected by sprocket chains 21 and 22 respectively, with larger sprockets 23 and 24 carried upon shafts 25 and 26, journalled in the gear boxes 11 and 12 heretofore mentioned.

The shaft 25 is provided with a small gear 27 and the shaft 26 with a similar gear 28. These gears in turn mesh with larger gears 29 and 30 respectively, mounted upon shafts 31 and 32 also journalled in the gear boxes 11 and 12 before mentioned, and directly above the before mentioned shafts 25 and 26.

The shaft 32 within the gear box 12 also carries a small sprocket 33 which is connected by sprocket chain 34 passing through an opening in the top of the bed and connects with a larger sprocket 35 in the upper portion of the machine and mounted upon worm-shaft 36 journalled in a bracket 37 secured to the side of the bed 38 of the machine. This latter line of drive serves to operate the mechanisms for reciprocating the vertically movable cutter slide and for indexing the turret, and is provided with a sliding clutch $36^a$ that is mounted upon the said worm-shaft 36 for engaging and disengaging the sprocket wheel 35 with the said shaft. This clutch is operated through a slide rod $36^c$ mounted in bearings of the bed and connected to be shifted longitudinally for the purpose of shifting the clutch by a hand lever $36^b$. The worm-shaft bracket 37 is made adjustable upon the bed by means of screw bolts 39 and an adjusting screw 40.

A worm 41 mounted upon the worm-shaft 36 serves to drive a worm gear 42 carried upon the outer end of a cam shaft 43 journalled in bearings of brackets 44 secured to the end of the bed 38. This shaft carries four cams, the first one of which is designated as 45 and serves to operate the turret indexing mechanism. The second cam designated as 46 is an index mechanism locking cam. The cam 47 provides the required vertical movement for the cutter head, its shaft and cutters and cam 48 provides reciprocatory movement for the cutter carriage. 49 represents a standard mounted upon the machine bed 38, and upon it is secured a bracket 50 to which a lever 51 is pivotally connected, the rear end of said lever being provided with a roll for engaging with the cam 47 before mentioned and the other end of the lever carries an adjustable pin $51^a$ with which the plate $51^b$ secured to cross-piece $52^a$ slidably engages during the reciprocatory movements of the carriage. The cross-piece $52^a$ forms a top member of the vertical slide 52 that carries bearings 71 and 72 in which a cutter shaft 54 is rotatably mounted. The vertically movable cutter slide 52 is mounted on a horizontally reciprocatory carriage 55 which is provided with both side and bottom slide members $55^a$ and $55^b$ respectively. The former being fitted to reciprocate in a way $50^a$ of the standard 49 and the latter to likewise reciprocate in a way $38^a$ of the bed 38. The two said slides serving to support and guide the carriage in reciprocatory movements for the feeding of the cutters into and away from the work to be milled.

A bracket 56 is adjustably secured to the side of this carriage and carries a roll 57 that operates in a cam groove 58 of the before mentioned cam 48 upon the cam shaft 43. A chain 59 which is mounted upon rolls 60 has one end connected to the carriage at 61 and the other end connected to a spring 62 attached to the bed of the machine. The normal tendency of said spring, through its chain connection 59, being to hold the roll 57 of the carriage 55 back against the cam. The vertically reciprocatory slide 52 mounted in the horizontally reciprocatory carriage 55 is normally held in its upper-most position by means of the springs 63 positioned between the cross member $52^a$ and carriage as is clearly shown in Fig. 2.

It will thus be seen that the cam 47 through its lever 51 serves to impart downward movements to the cutters against the action of the springs 63 and that said springs provide a return upward movement, there being one of said downward feeding cutting movements and a return movement of the cutters with each milling operation.

The carriage 55 as supported in this machine, is made to reciprocate more steady, and is not liable to yielding movements, due to the employment of a bottom slide $55^b$, in addition to the vertical slide $55^a$. Both of these slides are fitted in suitable guide-ways and provided with means for adjustment to take up wear. The slide $55^b$ is more conveniently made in the form of a separate bracket 64 which is secured to the carriage by means of screw bolts as is clearly shown in Figs. 2 and 7.

The forward end portion of the carriage 55 is provided with dove-tailed vertical guide-ways 65 and 66. The former being positioned in the side of the carriage and the latter in the front end thereof. These guide-ways are obviously for the purpose of receiving the correspondingly dove-tailed and vertically arranged slidable portions 67 and 68 of the vertical slide mounted therein. This vertical slide, as shown, is made up of several different parts and as before stated, is supported in part, in the said guide-ways, and in part upon springs 63 before mentioned, said springs being retained in position upon pins which may be supported in the cross-head and guided to operate in holes of the carriage. The springs serve to impart to the cross-head a lifting movement and to normally hold the cross-head in an elevated position when pressure of the arm 51 is released from vertical slide. In this connection it will be noted, see Fig. 7, that I also provide a screw 69 that freely passes through the top horizontal cross-member 52ᵃ of the said vertically reciprocatory slide 52 and is engaged and supported as at 52ᵇ in the main portion of the carriage 55, as shown. A nut 70, positioned upon the upper threaded portion of the screw 69, serves as a stop to limit the upward movement of the vertical slide, as produced by the springs 63 heretofore mentioned.

The vertical slide includes aligned bearings 71 and 72 in which are mounted a horizontal cross-shaft 54 carrying suitable number of cutters 73 for operating upon the parts to be milled. In this respect the cutters are obviously adjustable longitudinally upon the shaft and are interchangeable with other cutters of different size and kinds, not shown. The three bearings for the shaft are arranged in spaced relation so that the cutters just referred to are positioned between the center bearing 72 and one of the outer bearings 71, while the driving connection for the shaft is made between the center bearing 72 and an outer bearing 71 formed in bracket 74 as is clearly shown in Fig. 1. Provision is made for adjusting the bearings 71 and 72, the cutter shaft and cutters vertically upon and with respect to the vertical slide 52, by first loosening the several clamping nuts 71ᵃ and then turning the adjusting screw 71ᵇ which as will be seen, is rotatably mounted in the slotted bracket of the slide 52 and threadably engages the center bearing block 72 in a way to raise and lower the same with respect to the vertical slide member 52 and adjust the same as may be necessary.

Figure 2:
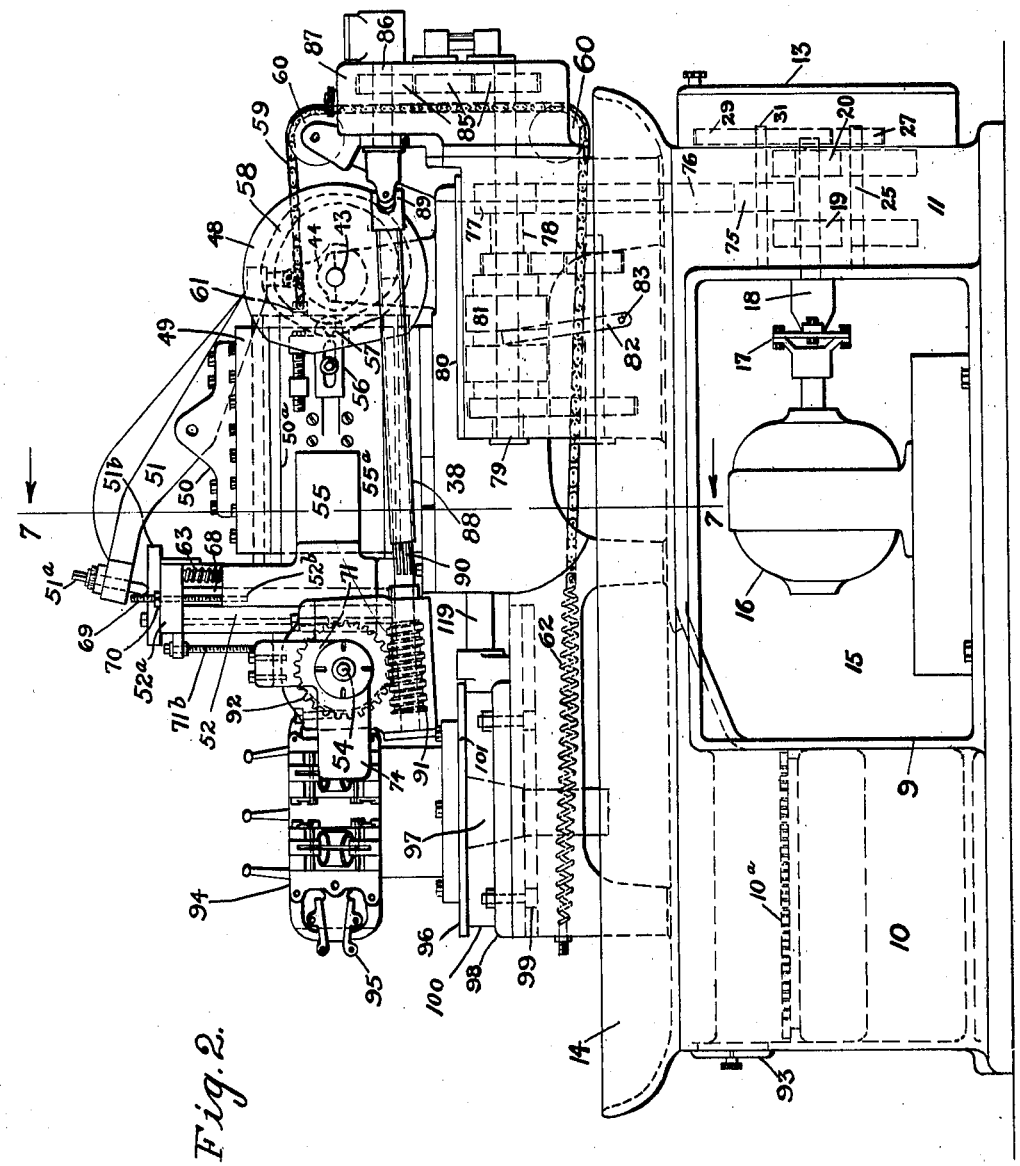
Fig. 2 is a side view of the same as seen from the near side of Fig. 1.
Figure 4:
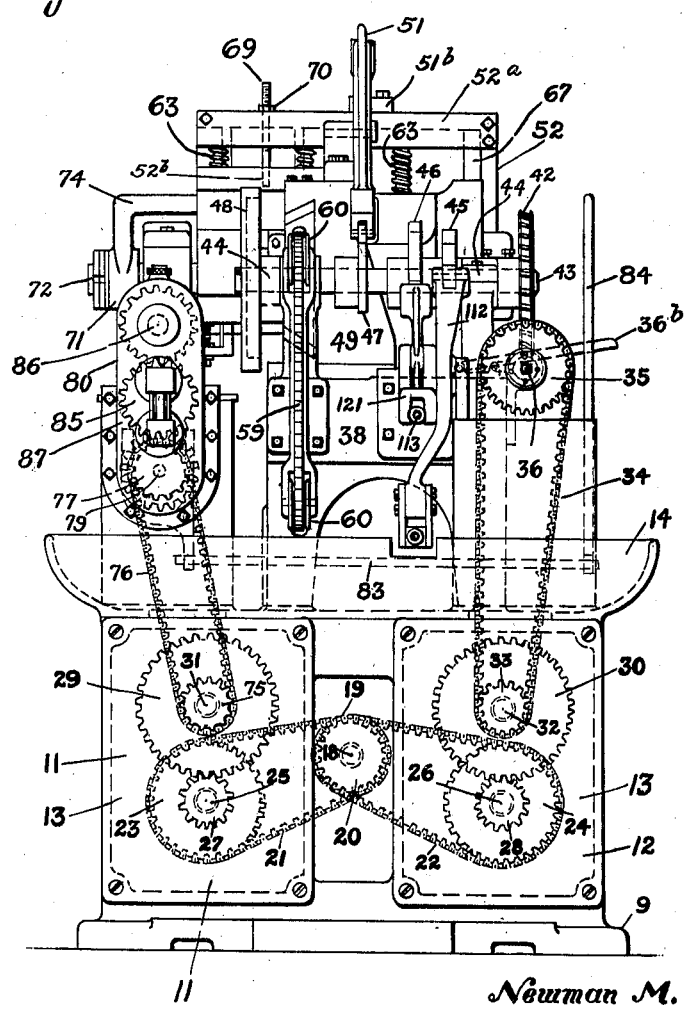
Fig. 4 is a rear end elevation as seen from the right of Figs. 1 and 2.

The drive for these cutters is through the change gears heretofore mentioned, contained in the gear box 11, see Figs. 2 and 4 and in this connection it will be seen that the shaft 31 of the gear train carries a small gear 75 which is connected by a sprocket chain 76 with a gear 77 upon clutch sleeve 78 mounted upon a clutch shaft 79 journalled in bearing of housing 80 mounted upon the bed 14 of the machine. 81 represents a movable clutch member on shaft 79 and 82 is a clutch arm secured to a rocker shaft 83 bearing an operating lever 84 upon its outer end portion by means of which the clutch may be engaged and disengaged for the starting and stopping of the milling operations. The rear end of the clutch shaft 79 is connected by gears 85 with the short shaft 86 journalled in an extension housing 87 of the beforementioned housing 80. This short shaft is connected to drive a tubular shaft 88 through a universal joint 89, said tubular shaft 88 being slidably mounted upon a splined shaft 90 journalled in a bearing of the vertically movable cutter slide 52 and has a worm 91 mounted thereon to drive the worm gear 92 secured within a housing upon the beforementioned cutter shaft 54. It will thus be seen that the cutters have driving connections whereby the cutters may be operated at different speeds and may be started and stopped at will, by the operation of a single hand lever. This connection is flexible in a manner which permits the cutters and cutter slide to not only be reciprocated vertically, but also horizontally. This enables the cutters to rise from the completed work and to be drawn back away from the turret to permit its successive rotations to bring new pieces into position.

The forward chamber portion 10 of the machine serves as an oil reservoir and is provided with a grating 10ᵃ upon which the chips may be collected and through which the oil drains into the reservoir from which it may be pumped back onto cutters and work. A removable door 93 serves as a means of removing the chips from the grating.

The turret, designated as 94, employed in this particular type of machine, operates on a vertical axis and is a four-faced or sided turret carrying two sets of fixtures on each side for holding work 95 to be milled. It will be obvious, of course, that other styles of fixtures adapted for holding different size and shape of pieces can be substituted so as to properly mill other jobs and in this respect, as before suggested, the cutters may be interchanged with others, the position shifted longitudinally to properly cooperate with the work as is necessary.

The turret 94 is mounted upon a pedestal that is removably bolted to rotatable table 96 having a central depending spindle 97 journalled in a bearing plate 98 which is adjustably mounted in the bed 38 of the machine. The said bed provided with longitudinally disposed T slots in which the heads of T bolts 99 are slidably positioned. The shanks of said bolts are extended up through the bearing plate and provided with nuts whereby bearing plate may be secured in its adjusted position with respect to length of machine. The said bearing plate is further provided with an annular flange 100 that projects up under an annular apron 101 of the table; the said construction being provided to prevent chips from getting into the bearing parts of the machine. A ratchet disk 102 is secured to the lower end of the table spindle 97 and in the present instance is provided with four notches 103 for engagement by a spring actuated pawl 104 carried in the outer end portion of a rocker arm 105 journalled upon a cylindrical extension 106. The spring actuated pawl 104 is positioned to slide upon a peripheral face of the ratchet disk 102 and is for the purpose of engaging, from time to time, the several notches of the disk in a way to rotate the same through a movement of the rocker arm. The spring actuated pawl 104 is provided with a pin 107 to engage the cam edge *a* of a bracket 108 secured to the bearing plate 98, which engagement takes place during the extreme forward movement or throw of said rocker arm 105 and is for the purpose of drawing the spring actuated pin 104 from the notch 103 with the completion of a ¼ rotation of the ratchet and its turret table and turret. The inner or hub portion of the arm 105 is provided with a peripheral rack 109 that is engaged and operated by a longitudinally disposed rack 110 slidably mounted in suitable bearings of the bed and is provided with an adjustable spring 111 whereby the said rack and arm are normally held in the position shown in Fig. 5, which represents a stationed or rest position of the turret during the time the milling operations are in effect. This rack is connected to be operated from the before mentioned cam 45 through a lever 112 pivotally connected to the before mentioned bed 38. The lower end of said lever is adjustably connected to a slide rod 113 slidably mounted in the bed 38 and connected by a link 114 with the before mentioned rack 110. This line of connection obviously serves to impart feeding movement to the turret table and turret from the before mentioned cam against the action of the spring 111. Said operation is obviously properly timed to cause the indexing of the turret to occur between the cutting operations.

Figure 3:
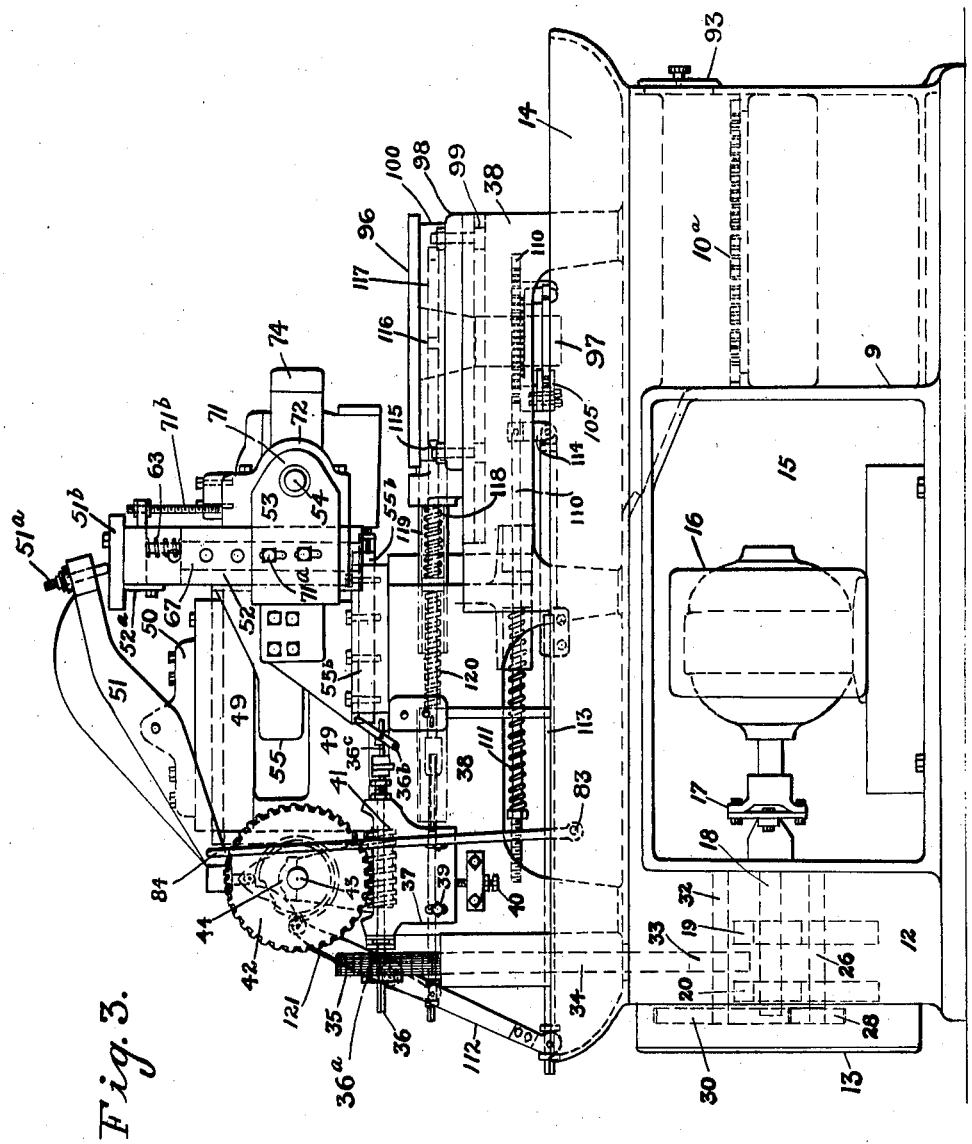
Fig. 3 is a side view of the machine as seen from the opposite side of Fig. 2, the turret being removed.

The turret head and its table are locked in their stationed positions, in order to hold them rigid during the milling operation by means of a plunger 115, see Figs. 3, 5 and 6 which engages notches 116 of a ring 117 secured to the rotatable table 96. Said plunger is forced into the notches by the action of the cam 46 and against the resistance of a spring 118, the spring being positioned in a tube 119 and adapted to receive a rod 120 the outer end of which is connected to the lower end of a lever 121 mounted upon a pivot of a bracket secured to the bed 38 and engaged to be operated by the before mentioned cam 46.

Having thus described my invention, what I claim and desire to secure by Letters Patent is:

1. In a milling machine, a bed having ways, a standard positioned thereon and also provided with ways, a reciprocatory carriage having ways slidably mounted in the ways of the bed and standard, a vertically movable cutter slide mounted in the carriage, means for reciprocating the carriage, means for operating the cutter slide, a cutter shaft and cutters thereon carried in the slide, driving connection for the cutter shaft, said driving connection including a worm and worm gear, a splined shaft carrying the worm, said worm gear on the cutter shaft, flexible joints in said splined shaft, driving means for said shaft, a clutch mechanism interposed between the driving means and said cutter shaft, and change gears also interposed between said driving means and cutter shaft.

2. In a milling machine, a bed having ways, a standard having ways in its side to receive ways on the side of the slide, a reciprocatory carriage having ways on its bottom and side slidably mounted in the ways of the bed and standards, a vertically movable slide mounted in the carriage, means for vertically moving the same with relation to the carriage, means to limit said movements, adjustable and removable bearings mounted upon the slide, a cutter shaft in bearings, cutters carried upon the shaft, driving connections with one end portion of the shaft, and a turret rotatably mounted on a vertical axis with relation to the cutters.

3. In a milling machine the combination of a bed, a cutter shaft, means for rotating the same, means for moving the shaft to and from work to be milled, a bearing plate adjustably mounted on and longitudinally of the bed, a table rotatably mounted in the bearing plate, a turret secured to the table and having means to support work to be operated on, a ratchet disk mounted upon the rotary table, a rocker arm having a toothed segment and bearing a pawl to engage the ratchet disk, means carried by the rocker arm to engage and rotate the ratchet disk a reciprocatory rack to engage the segment, and a slidable plunger for engagement with notches in the rotary turret table.

4. In a milling machine, the combination of a bed, a cutter shaft, means for rotating the same, means for moving the shaft to and from the work to be milled, a turret head positioned with relation to the cutters and adapted to carry work to be operated on by said cutters, a bearing plate adjustably mounted on the bed of the machine and on which the turret is mounted, a ratchet disk mounted upon the rotatable table, a rocker arm bearing a pawl to engage the ratchet disk, a pin mounted in the rocker arm to engage the teeth of the ratchet disk, means to engage the pin to disengage it from the ratchet wheel, a reciprocatory tooth rack for engaging and operating the rocker arm, and a slidable plunger for engagement with notches in the periphery of the rotary turret table to be engaged during the milling operation.

5. In a milling machine, a base, a carriage on the base, a cutter shaft on said carriage, means to reciprocate the carriage on the base, said means including a cam shaft and a cam on the shaft, a motor, a pair of gear boxes, a set of gears in each of said gear boxes, a separate driving connection from the motor to each of the gear sets, a driving connection between one of the gear sets and the cutter shaft, a driving connection between the other gear set and the cam shaft, an oil chamber in one end portion of the base, said gear boxes being spaced apart and in the other end portion of the base, said base having a space between the gear boxes and the oil chamber, and said motor mounted in said space.

6. In a milling machine, a base, a carriage, a cutter shaft on the carriage, means including a cam shaft and a cam to reciprocate the carriage, a motor, a pair of gear boxes, a gear set in each of said boxes, a separate driving connection from the motor to each of said gear sets, a driving connection from one of the gear sets to the cam shaft, a driving connection from the other gear set to the cutter shaft, said gear boxes arranged at one end of the base and spaced apart, said base having a space forwardly of the gear boxes, said motor arranged in said space, a shaft from the motor extending into the space between the gear boxes, and said separate driving connection for each of the gear sets extending from said shaft.

Signed at Bridgeport in the county of Fairfield and State of Connecticut this 14th day of May, A. D. 1927.

NEWMAN M. MARSILIUS.